UNITED STATES PATENT OFFICE.

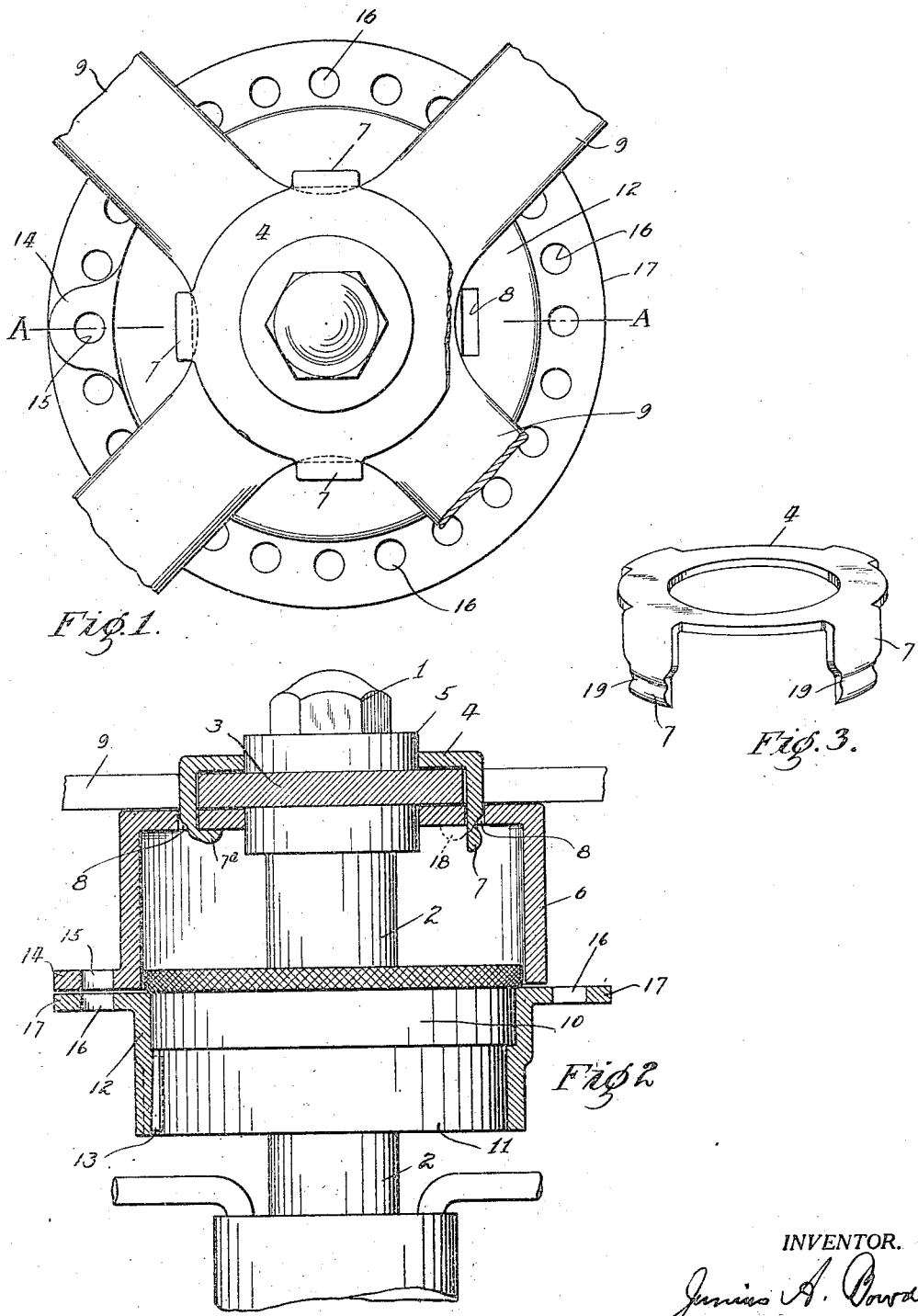

JUNIUS A. BOWDEN, OF LOS ANGELES, CALIFORNIA.

STEERING-WHEEL-LOCKING MEANS FOR AUTOMOBILES.

1,225,697.      Specification of Letters Patent.      Patented May 8, 1917.

Application filed August 21, 1916. Serial No. 116,036.

*To all whom it may concern:*

Be it known that I, JUNIUS A. BOWDEN, a citizen of the United States, residing at Los Angeles, in the county of Los Angeles, State of Califorina, have invented new and useful Improvements in Steering-Wheel-Locking Means for Automobiles, of which the following is a specification.

This invention relates to an improvement upon the applicant's invention filed August 7, 1916, Serial Number 113,625.

The object of my improvement is to provide such construction and arrangement of parts that are adapted to be permanently secured to a steering wheel in such a manner as to make it impossible to remove the improved parts without considerable delay, and furthermore cause the destruction of the parts.

Referring to the drawings Figure 1 shows a plan view of a steering wheel, rim of wheel not shown, in combination with my improved means of securing parts to a steering wheel. Fig. 2 shows a sectional view on line between A—A of the same parts as shown in Fig. 1 assembled on hub 5 of a steering wheel and a flange collar on the housing of a steering mechanism. Fig. 3 shows a view in perspective of the clamping ring 4.

Referring specifically to the improved parts adapted to the steering wheel and manner of permanently securing them to prevent them being detached; the steering wheel 3 is removed, the clamping ring 4 is placed over upper portion of hub 5 and the wheel is turned over with prongs 7 of the ring looking upward, the cylindrical member 6 is then placed over the other end of hub with slots 8 in said member registering with the prongs of the ring and the two parts are thus united and the prongs bent down as indicated at 7ª. It is to be understood the upper end of prongs fit tightly against and between the spokes 9 as shown in Fig. 1, this is done to avoid looseness, which is important as for instance, the wheel may be jerked suddenly by one attempting to damage the parts to release them, when member 6 and collar 12 are locked together. By permanently uniting ring 4 and member 6 with the wheel as shown they all become as one part and may be removed as a unit when occasion may require. Before replacing the steering wheel, cover 10 to the steering mechanism housing is removed and the flange collar 12 is slid over the housing then said cover is replaced and the collar 12 brought up to where the ledge of the flange bears against and beneath the cover. The collar is then keyed to said housing indicated at 13, the steering wheel is then replaced; this will bring the flange 14 of member 6 close to flange 17 of the collar 12 and by movement of the steering wheel moves member 6. The perforation 15 in flange 14 may be brought to register with any one of the perforations 16 in collar 12 and locked in that position by inserting the shackle of a padlock (not shown) through and engaging said perforations and in this manner prevent movement of the steering wheel.

I do not limit myself to the shape of the ring 4 or member 6, neither do I limit myself to the manner of binding these two elements and the steering wheel together.

What I claim is:

1. In a device for locking a steering wheel of an automobile, comprising a clamping ring, a cylindrical member having an external flange and an inwardly directed flange, a perforation in said external flange, numerous perforations in said inwardly directed flange, said ring having numerous prongs, said member adapted to engage the lower part of the hub of the steering wheel, said ring adapted to engage upper part of the hub of the steering wheel, said prongs adapted to enter said perforations in the inwardly directed flange and adapted to be clenched thereto for binding the ring and member to said hub, a collar adapted to be secured upon the housing of a steering rod, a flange on said collar and a perforation in said flange, for the purpose described.

2. Means for locking the steering wheel of an automobile, in combination with the steering wheel and housing of the steering rod, comprising a clamping ring and a cylindrical member, said ring adapted to engage the upper part of the spokes of said wheel near the hub of the wheel, said member adapted to engage the lower part of the spokes of said wheel near the hub of the wheel, means between said spokes adapted to extend from the ring to the member whereby the ring and member may be drawn securely to said spokes, a flange on said member, a perforation in said flange, a collar adapted to be secured upon said housing, a flange on said collar, a perforation in said flange, said perforation adapted to register with the perforation in the flange of said member for the purpose described.

3. Means for locking the steering wheel of an automobile, in combination with the steering wheel and housing of the steering rod, comprising three main elements, a clamping ring, a cylindrical member having an external flange, a collar having a flange, a perforation in the flange of said collar, a perforation in the flange of said member, said member having an end wall and a central opening in said wall, means between the ring and member adapted to attach to the ring and to the member whereby the ring and member may be bound rigidly against the hub of the steering wheel, the collar adapted to be secured upon the housing of the steering rod, the perforation in the flange of said member adapted to register with the perforation in the flange of said collar whereby said flanges may be locked together for the purpose described.

In testimony whereof, I have hereunto set my hand, at Oakland, California, this 15th day of August, 1916.

JUNIUS A. BOWDEN.